United States Patent [19]
Brobst

[11] 3,961,839
[45] June 8, 1976

[54] INDOOR-OUTDOOR IMAGE PROJECTION SYSTEM

[76] Inventor: Clarence O. Brobst, 2223 Washington, Cedar Falls, Iowa 50313

[22] Filed: Sept. 12, 1974

[21] Appl. No.: 505,489

Related U.S. Application Data

[63] Continuation of Ser. No. 267,634, June 29, 1972, abandoned.

[52] U.S. Cl. ................................. 350/117; 353/71
[51] Int. Cl.² ........................................ G03B 21/56
[58] Field of Search .............. 350/117; 352/104; 35/63; 40/83, 82, 130 B; 353/71, 13

[56] References Cited
UNITED STATES PATENTS

| | | | |
|---|---|---|---|
| 1,798,078 | 3/1931 | Geyling | 40/130 B |
| 2,022,903 | 12/1935 | Thomas | 352/104 |
| 2,391,879 | 1/1946 | Chambers | 353/71 |
| 2,528,311 | 10/1950 | Hurley | 35/63 |
| 2,895,233 | 7/1959 | Welch | 40/82 |
| 3,587,183 | 6/1971 | Davis | 40/83 |

FOREIGN PATENTS OR APPLICATIONS

| | | | |
|---|---|---|---|
| 385,798 | 5/1908 | France | 353/13 |
| 295,581 | 10/1929 | United Kingdom | 350/117 |

*Primary Examiner*—Monroe H. Hayes
*Attorney, Agent, or Firm*—Zarley, McKee, Thomte & Voorhees

[57] ABSTRACT

A projection screen having back-to-back screen surfaces is provided outside a building for projection of images from within the building from a slide projector or the like positioned at a projection window. A mirror unit is provided on the outside for receiving the image from the projector and directing it onto the outside screen surface. Display material is provided on a roll-up screen which is pulled down during the daytime. A shade is provided over the screen surfaces to shield the screen from outside light sources. The projector in the building is on a rotatable support and a mirror is provided adjacent the projection window for directing the image to a screen in the building upon the projector being turned slightly. The screen outside the building may allow an image to be projected through it thereby providing an image on both sides thereof and thus requiring only one projector.

5 Claims, 6 Drawing Figures

U.S. Patent  June 8, 1976  3,961,839
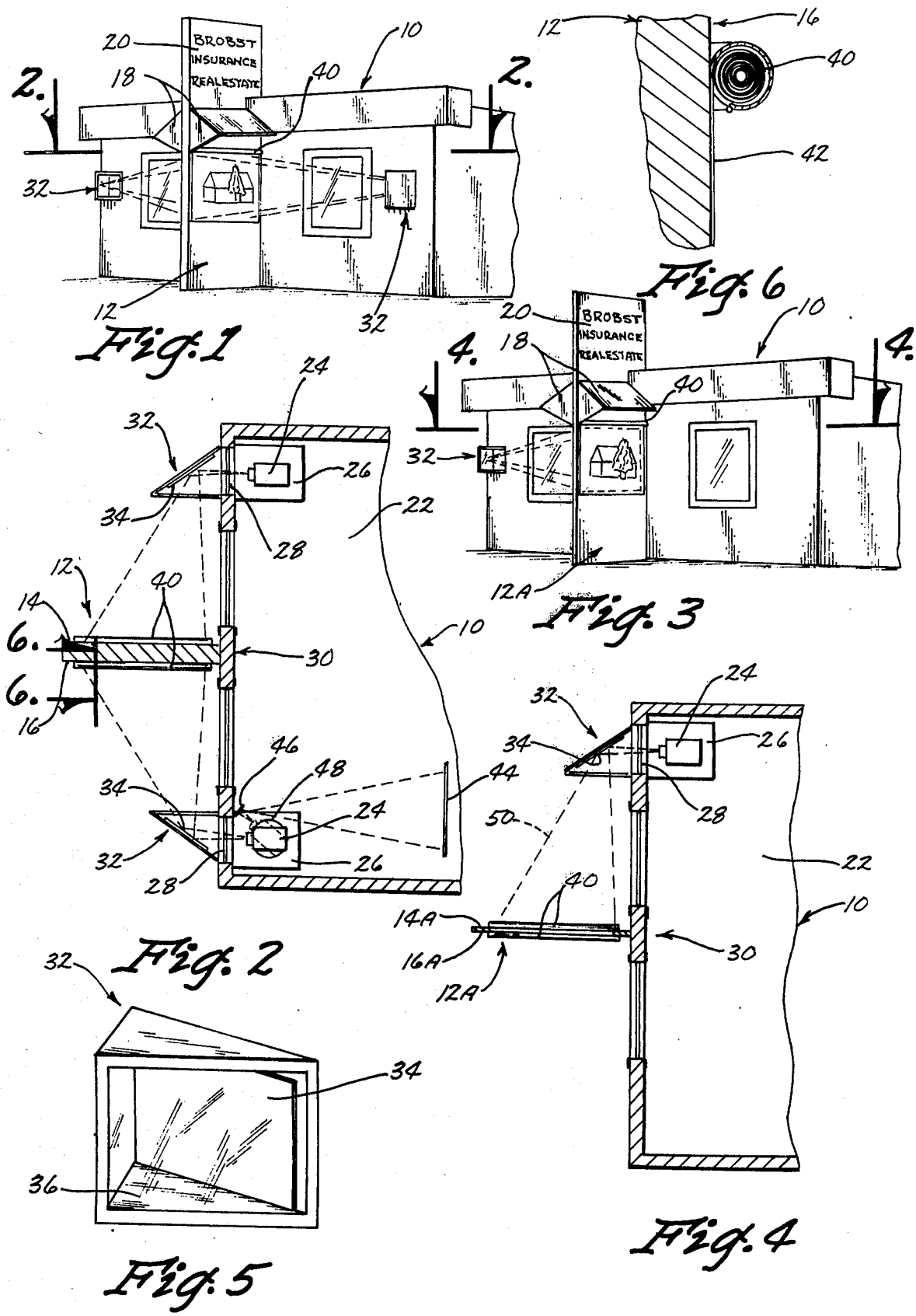

INDOOR-OUTDOOR IMAGE PROJECTION SYSTEM

This is a continuation of application Ser. No. 267,634 filed June 29, 1972, now abandoned.

The indoor-outdoor image projection system of this invention allows a business such as a real estate office, restaurant, car dealer, as examples, to present a continually changing display message outside the building easily observable by passers-by on the sidewalk and in the street. In the daytime a display screen can be pulled down for presenting a static display message. At night, a slide projector or movie projector is provided inside the building and is automatically set to sequentially present different messages on the outside screen surface. The screen outside may be of such a material that the image will appear on both surfaces thus making it necessary to use only one projector. During the daytime the projector may be used for indoor presentations by positioning a mirror closely adjacent to the projection window such that the image is directed onto a screen by only turning the projector a slight amount.

The projection system of this invention, when used in a real estate business, as an example, projects pictures of homes for sale on the outside screen surfaces for passers-by to observe and study. In a restaurant business the screen may include changing food or menu displays. The car business, of course, would show different cars for sale. The ever-changing display will catch and hold the attention of people passing by the place of business.

This invention consists in the construction, arrangements, and combination of the various parts of the device, whereby the objects contemplates are attained as hereinafter more fully set forth, specifically pointed out in the claims, and illustrated in the accompanying drawings in which:

FIG. 1 is a perspective view of a building equipped with the indoor-outdoor image projection system of this invention.

FIG. 2 is a cross sectional view taken along line 2 — 2 in FIG. 1.

FIG. 3 is a view similar to that of FIG. 1 but showing an outdoor screen with an image on opposite sides projected by a single projector.

FIG. 4 is a cross sectional view taken along line 4 — 4 in FIG. 3.

FIG. 5 is a perspective view of the mirror unit.

FIG. 6 is a cross sectional view taken along line 6 — 6 in FIG. 2.

The indoor-outdoor image projection system of this invention is seen in FIG. 1 to include a building 10 having an outdoor screen 12 extending perpendicular to the building 10. As seen in FIG. 2, oppositely facing screen surfaces 14 and 16 are provided on the screen 12 and are shielded from outdoor light by shades 18. A panel 20 above the shades is utilized for advertising or the like such as indicia that indicates the name and type of business, e.g.; Brobst Insurance & Real Estate.

Inside the building 10 is a room 22 and a slide projector or movie projector 24 is positioned on a support 26 such that an image may be projected through a projection window 28 in the exterior wall 30. A mirror unit 32 is secured to the outside of the wall 30 and includes a mirror 34 sealed by glass 36 against dirt and moisture. The relationship between the projector 24, the mirror 34 and the screen surface 14 are such that the desired image is projected on the screen surface 14. The mirror unit 32 may be secured to any exterior wall including glass windows which sometimes extend the full length of a building such as a restaurant.

During the daytime when the use of the projector is not feasible a static display may be provided on the screen 12 by a canvas roll 40 being provided under the shades 18 and being adapted to be pulled down as seen in FIG. 6 to provide a display canvas 42. Any desired advertising material or the like may be provided on this canvas surface 42.

Also during the day, the projector 24 may be used by providing images on a screen 44 in the room 22. A mirror 46 is positioned closely adjacent the projection window 28 and the projector 24 is provided on a rotatable table support 48 on the support 26 such that the projector may be turned a slight amount to direct an image against the mirror 46 which in turn flashes it on the screen 44, as seen in FIG. 2. The projectors at both ends of the room in FIG. 2 may be identical or different as desired.

In FIGS. 3 and 4 the outdoor screen 12A is of such a material that the image 50 coming from the mirror unit 32 appears on both sides 14A and 16A. It is noted that the image on the surface 16A will be reversed since it is as if you were looking at writing from the backside of a piece of paper. The use of this screen 12A makes it necessary to have only one projector 24 and mirror unit 32. The pull-down daytime screens 40 are still provided above the screen surface 14A and 16A.

The screen 12 may be of any desired material but it has been found that tempered masonite sprayed with chrome aluminum is suitable for allweather usage. The see-through screen 12A can be protected against weather by being enclosed in glass if desired. Also, the screens 12 and 12A may be positioned separately and at a distance from the building 10. The projection angle would have to be varied accordingly.

In use it is seen that for example in the real estate business, the houses listed by the particular firm can be photographed on 35 millimeter slides and placed in the projectors 24. During the evening hours the projector can be set to automatically cycle through the slides every thirty seconds or so thereby providing a ever-changing display on the screen 12 outside the building for people on the street and sidewalks to observe and study as they pass by. The machine can also be set to turn off automatically after the prime time in the evening has past. During the daytime the canvas screens 40 may be pulled down to provide an advertising scene which, of course, can be varied from day to day by replacing the canvas roller. Further, the projector 24 may be used during the day for presentations inside the building in the room 22 by projecting onto the mirror 46 which in turn reflects the image to the screen 44. The turntable 48 makes this convenient by requiring the projector to be turned only a quarter of a turn. The application of the indoor-outdoor image projection system of this invention is limitless and the real estate, restaurant, and auto sales business represents only a few of typical businesses that can advantageously use this projection system.

I claim:

1. An indoor-outdoor image projection system, comprising, a building located along a public thoroughfare and having an exterior vertical wall parallel to said thoroughfare, a vertically disposed screen at eye level from the ground, positioned outside said building between the wall and the thoroughfare and extending substantially perpendicular to said wall and said thoroughfare, and said screen having oppositely facing viewing faces viewable from said thoroughfare, a pair of projection windows in said wall, a pair of image projection sources in said building positioned on the inside face of said wall and on opposite sides of said screen to project images through the adjacent projection windows, and a mirror unit including an enclosure positioned on the outside face of said wall directly adjacent each projection source to receive said image from said inside projection source and direct it onto the adjacent face of said screen, said mirror unit having a mirror extending at a 45° angle to said wall and said screen, said screen being positioned substantially equal distance between said mirror units, a screen being provided inside said building and said image projection source being positioned on a rotatable support such that said projection source can be turned, a mirror inside said building being positioned closely adjacent said projection window and being aligned between one of said projection sources and said screen in said building to transmit said image to said screen in said building upon said one projection source being turned only a few degrees from said outside mirror unit, and the distance from said mirrors to said screen being greater than the distance from said projection sources to said mirrors and said screen being substantially larger than said mirror unit thereby making said screen more noticeable than said mirror units.

2. The structure of claim 1 wherein said enclosure is sealed to protect a mirror in said enclosure from the outside elements.

3. The structure of claim 1 wherein a shade is provided over said screen to shade said screen from outside light.

4. The structure of claim 1 wherein said screen includes a pull-down display of visual material for viewing during the daylight hours.

5. The structure of claim 1 wherein said screen is an integral part of said building.

* * * * *